United States Patent [19]
Waldman et al.

[11] Patent Number: 5,903,896
[45] Date of Patent: May 11, 1999

[54] METHOD FOR INSTALLING A FILE ON DEMAND USING A PREVIEW

[75] Inventors: Benjamin Waldman, Seattle, Wash.; Samuel David Hobson, Palo Alto, Calif.

[73] Assignee: Microsoft Corporation, Redmond, Wash.

[21] Appl. No.: 08/892,696

[22] Filed: Jul. 15, 1997

[51] Int. Cl.[6] .................................................. G06F 17/30
[52] U.S. Cl. .......................... 707/200; 395/651; 395/653
[58] Field of Search ................................. 380/4; 395/186, 395/651, 652, 653; 707/200–204

[56] References Cited

U.S. PATENT DOCUMENTS

| | | | |
|---|---|---|---|
| 5,222,134 | 6/1993 | Waite et al. | 380/4 |
| 5,291,585 | 3/1994 | Sato et al. | 395/500 |
| 5,291,598 | 3/1994 | Grundy | 395/186 |
| 5,319,705 | 6/1994 | Halter et al. | 380/4 |
| 5,327,563 | 7/1994 | Singh | 380/4 |
| 5,375,240 | 12/1994 | Grundy | 395/186 |
| 5,530,943 | 6/1996 | Gericke et al. | 395/652 |
| 5,555,416 | 9/1996 | Owens et al. | 395/712 |
| 5,586,324 | 12/1996 | Sato et al. | 395/652 |
| 5,628,015 | 5/1997 | Singh | 395/186 |
| 5,797,015 | 8/1998 | Daniels, Jr. et al. | 395/712 |
| 5,828,851 | 10/1998 | Nixon et al. | 395/285 |

*Primary Examiner*—Maria N. Von Buhr
*Attorney, Agent, or Firm*—Jones & Askew, LLP

[57] ABSTRACT

Installing for use with a computer a file on demand using a preview file. A feature of a program is represented by a preview file and a feature file. The feature file contains all the components necessary to support the feature. The preview file contains a subset of the feature file. Only the preview file is initially installed. The preview file may be used to preview and select the feature. If the feature is selected, then the feature file is installed and the preview file is deleted.

13 Claims, 5 Drawing Sheets

METHOD FOR INSTALLING A FILE ON DEMAND USING A PREVIEW

FIELD OF THE INVENTION

This invention relates in general to installing a file on a computer, and in particular to installing a file on demand using a preview file.

BACKGROUND OF THE INVENTION

During the installation of a computer program a number of files are typically installed on a user's local disk. For example, a file representing the executable code for the application program or a file representing a feature of an application program may be installed. Because local disk space is often at a premium, some application programs present display screen(s) that prompt the user to answer a series of questions to determine which files to install. The questions are designed to identify the files the user will need for proper operation of the application program so that local disk space is not wasted on unneeded files. However, in many instances the user is unable to properly answer the questions. For example, if the user is unfamiliar with the application program, the user may be unable to predict which files the user will need and to properly answer the questions.

If a file representing a feature is not initially installed, then the feature cannot be used until the file is installed. In this event, the user typically must manually install the needed file. To install the file, the user must locate the original source for the application program and then install the file. To avoid the possibility of having to install files after the initial installation, a user may decide, out of an abundance of caution, to initially install all available files. However, the user may never use many of these files. The unused files can contribute to a bloated installation size, sub-optimal use of local disk space and a lengthened configuration time.

Therefore, the user is forced to choose between installing all available files or installing only some of the files. Installing all available files avoids a second installation and insures that all features are available. However, installing all available files creates installation bloat and increases installation time. If the user could perform an initial installation which would support the installation of additional files on an as needed basis, then the user would not need to perform a second installation or to install files that are never used.

Accordingly, there is a need in the art for a method for installing a file on demand for operation with a computer.

SUMMARY OF THE INVENTION

The present invention meets the need described above by supporting the installation on a computer of a file on demand. A feature of a program can be represented by two files, a feature file and a preview file. The feature file contains components necessary to support the feature. The preview file contains a subset of the feature file. During installation, only the preview file is installed for use with the computer. Because the preview file is significantly smaller than the feature file, initially installing the preview file rather than the feature file conserves local disk space and reduces installation time. The preview file may be used to preview the feature and to select the feature. If the feature is selected, then the feature file is installed and the preview file is deleted.

A default installation module and an on-demand installation module can be used to install a file on demand. The default installation module installs one or more preview files on the local disk. In addition to the preview file(s), the default installation module may install a default feature file. If a feature other than the default feature is selected, then the on-demand installation module performs any required installation. If a non-default feature is selected, then the on-demand installation module determines whether the feature file which supports the selected feature is installed on the local disk. If the feature file which supports the selected feature is not installed on the local disk, then the on-demand installation module installs the feature file. Once the feature file is loaded onto the local disk, the on-demand installation module deletes the preview file corresponding to the selected feature from the local disk.

During installation, the default feature file is installed onto the local disk by copying the default feature file from the original source disk to the local disk. Similarly, the preview file(s) are installed onto the local disk by copying the preview file(s) from the original source disk to the local disk. The location of the original source, which contains the feature file(s) corresponding to the preview file(s), can be saved during initial installation.

During operation of the program, a feature may be previewed and selected using the preview file. If a non-default feature is selected, then the feature file corresponding to the selected feature is located. The feature file can be located using the previously saved location information. Typically, the name of the preview file and the corresponding feature file are related so that the name of the feature file may be easily determined from the name of the preview file. Once the feature file corresponding to the selected feature has been located, the feature file is loaded from the original source and the preview file is deleted from the local disk.

These and other aspects, features and advantages of the present invention may be more clearly understood and appreciated from a review of the following detailed description of the disclosed embodiments and by reference to the appended drawings and claims.

DETAILED DESCRIPTION

The present invention is directed to a method for installing a file on demand for use with a program running on a computer. In one embodiment, the invention is incorporated into the "OFFICE" suite of application programs, marketed by Microsoft Corporation of Redmond, Wash. Briefly described, a feature file is installed for use with a computer when a feature corresponding to the feature file is selected. Each feature can be represented by at least two files, such as a feature file and a preview file. The feature file contains components necessary to support the feature during operation of the program. The preview file contains a subset of the feature file. Only the preview file is initially installed. The preview file may be used to preview the feature and to select the feature. If the feature is selected, then the feature file is installed and the preview file is deleted.

Exemplary Operating Environment

Figure 1:
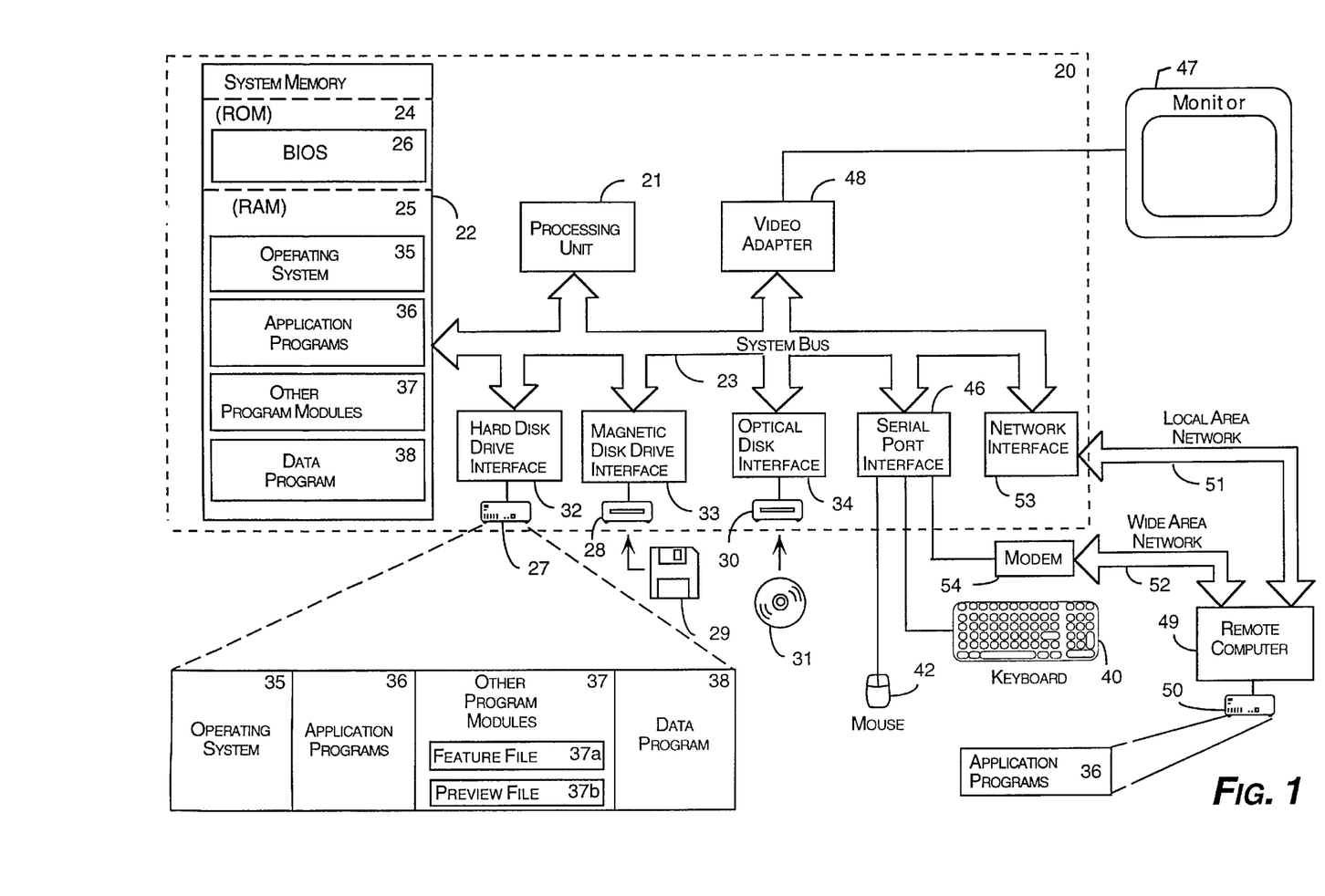
FIG. 1 is a block diagram of a personal computer illustrating the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. In accordance with an embodiment of the present invention, a local disk, such as hard disk drive 27 may store a feature file 37a and one or more preview files 37b. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Office Assistant

One embodiment of the present invention may be used to install an Office Assistant feature file on demand. An Office Assistant is an animated character that provides interactive advice and tips for using the "OFFICE" suite of application programs. An Office Assistant provides a social user interface between the user and the computer by interacting with the user via word-balloons and animation. For example, an Office Assistant may suggest using a letter template to enter a letter in a word processing program or may provide a reminder for an upcoming appointment stored in a scheduling program. An Office Assistant may also answer questions posed by the user.

To appeal to a wide variety of users, a variety of Office Assistants are available. Each Office Assistant is different in appearance and in personality. For example, one Office Assistant may convey an authoritative personality while a different Office Assistant may convey a cajoling personality. Each Office Assistant is represented by two files, a feature file and a preview file. A feature file contains all the components necessary to Support an Office Assistant, such as animation components, phrase components and sound components. A preview file contains a subset of the feature file components. Typically, a preview file contains a single animation component and only a few of the phrase components.

To conserve local disk space and to reduce the installation time, only one of the Office Assistants is initially installed, namely the default Office Assistant. The default Office Assistant is installed by installing the feature file representing the default Office Assistant on the local disk. In addition to the default Office Assistant feature file, the preview files for the remaining Office Assistants are also installed. An Assistant Gallery may be used to preview the different Office Assistants. The Assistant Gallery uses the preview files to display the animated characters representing the Office Assistants and to provide a short introduction to each Office Assistant. If the user selects a non-default Office Assistant from the Assistant Gallery, then the feature file representing the selected Office Assistant is installed on the local disk and the preview file representing the selected Office Assistant is deleted.

On Demand File Installation

The present invention may be used to install a feature file when the feature corresponding to the feature file is selected. A feature is represented by at least two files, typically a feature file and a preview file. The feature file can contain components necessary to support the feature. The preview file contains a strict subset of components of the feature file and is significantly smaller than the feature file. The names of the feature file and the preview file are preferably related so that the name of the feature file may be easily determined from the name of the preview file.

Typically, a default feature file and one or more preview files are installed when the system is configured. The default feature file and the preview file(s) are installed by loading the files from an original source, such as a CD ROM disk or a network disk via a network (LAN or WAN) onto a local disk. If a feature other than the default feature is selected, then the feature file corresponding to the selected feature is loaded onto the local disk from the original source. Once the feature file is loaded, the preview file corresponding to the selected feature can be deleted from the local disk.

Figure 2:
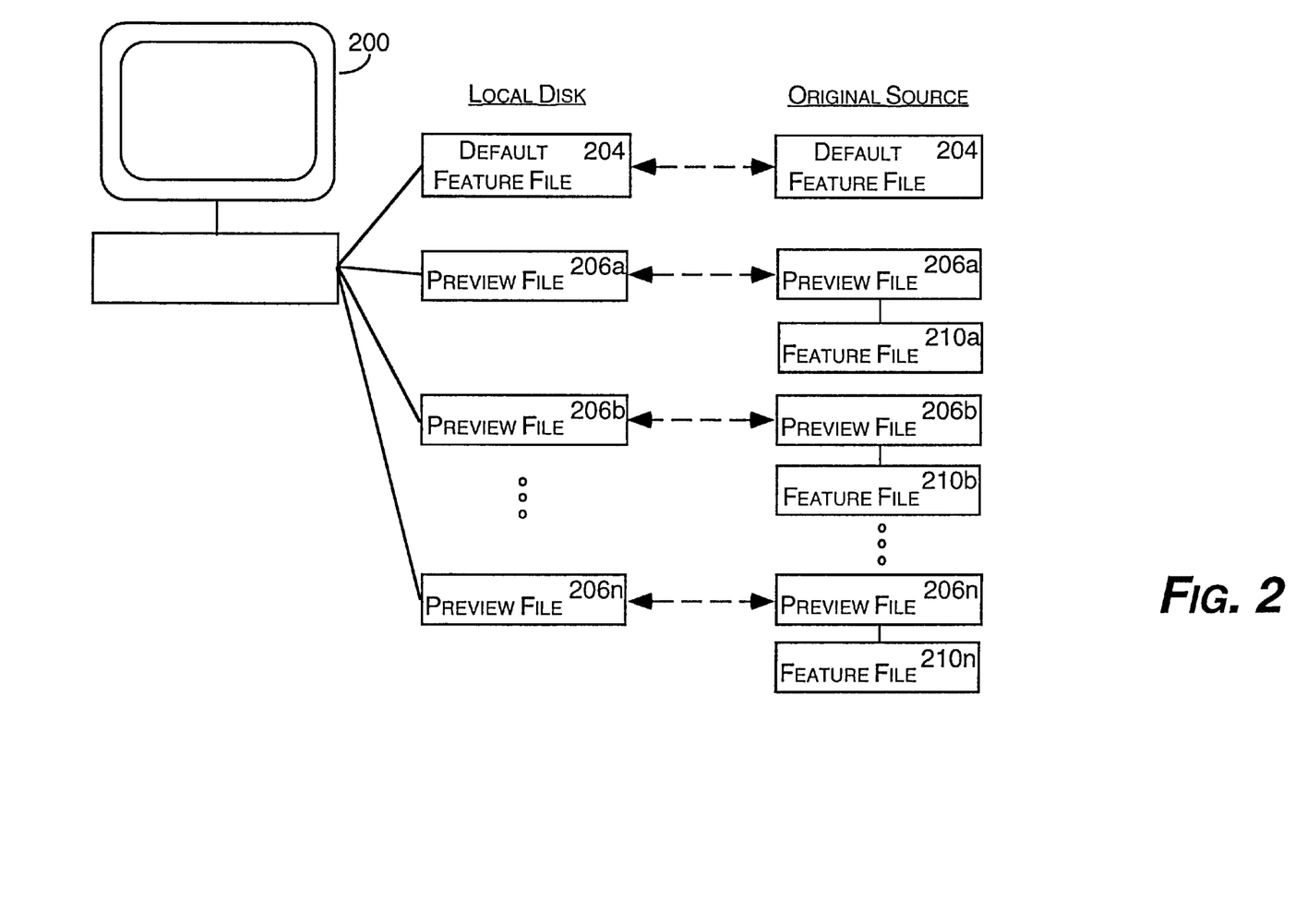
FIG. 2 is a block diagram illustrating the file components for an embodiment of the present invention.

FIG. 2 illustrates file components of a program in accordance with an embodiment of the present invention. In FIG. 2, the feature files $210a, 210b \ldots 210n$, including a default feature file 204, and the preview files $206a, 206b \ldots 206n$ are stored on an original source. The original source is typically a computer-readable medium such as a CD ROM disk or a network disk storing files necessary to install and operate a program. Each preview file $206a, 206b \ldots 206n$ corresponds to a feature file $210a, 210b \ldots 210n$. For example, preview file 206a corresponds to feature file 210a and preview file 206b corresponds to feature file 210b. Both the feature file and its corresponding preview file support the same feature. During installation, the default feature file 204 and the preview files $206a, 206b \ldots 206n$, are loaded onto the local disk of computer 200. The local disk is typically the hard disk drive of computer 200. In contrast, the feature files $210a, 210b \ldots 210n$ corresponding to the preview files $206a, 206b \ldots 206n$ are not initially installed on the local disk. Although a default feature file 204 is illustrated in FIG. 2, a default feature file is optional. If the default feature file is not implemented, then the original source contains only feature files $210a, 210b \ldots 210n$ and preview files $206a, 206b \ldots 206n,$ and only the preview files $206a, 206b \ldots 206n$ are initially loaded.

During operation of the program, a feature, other than the default feature, may be selected. If a non-default feature is selected, then the feature file corresponding to the selected feature is loaded onto the local disk. For example, if the feature corresponding to preview file 206a and feature file 210a is selected, then the feature file 210a is loaded from the original source onto the local disk. Since the preview file 206a is a subset of the feature file 210a, once the feature file 210a is installed, the preview file 206a is deleted from the local disk.

Figure 3:
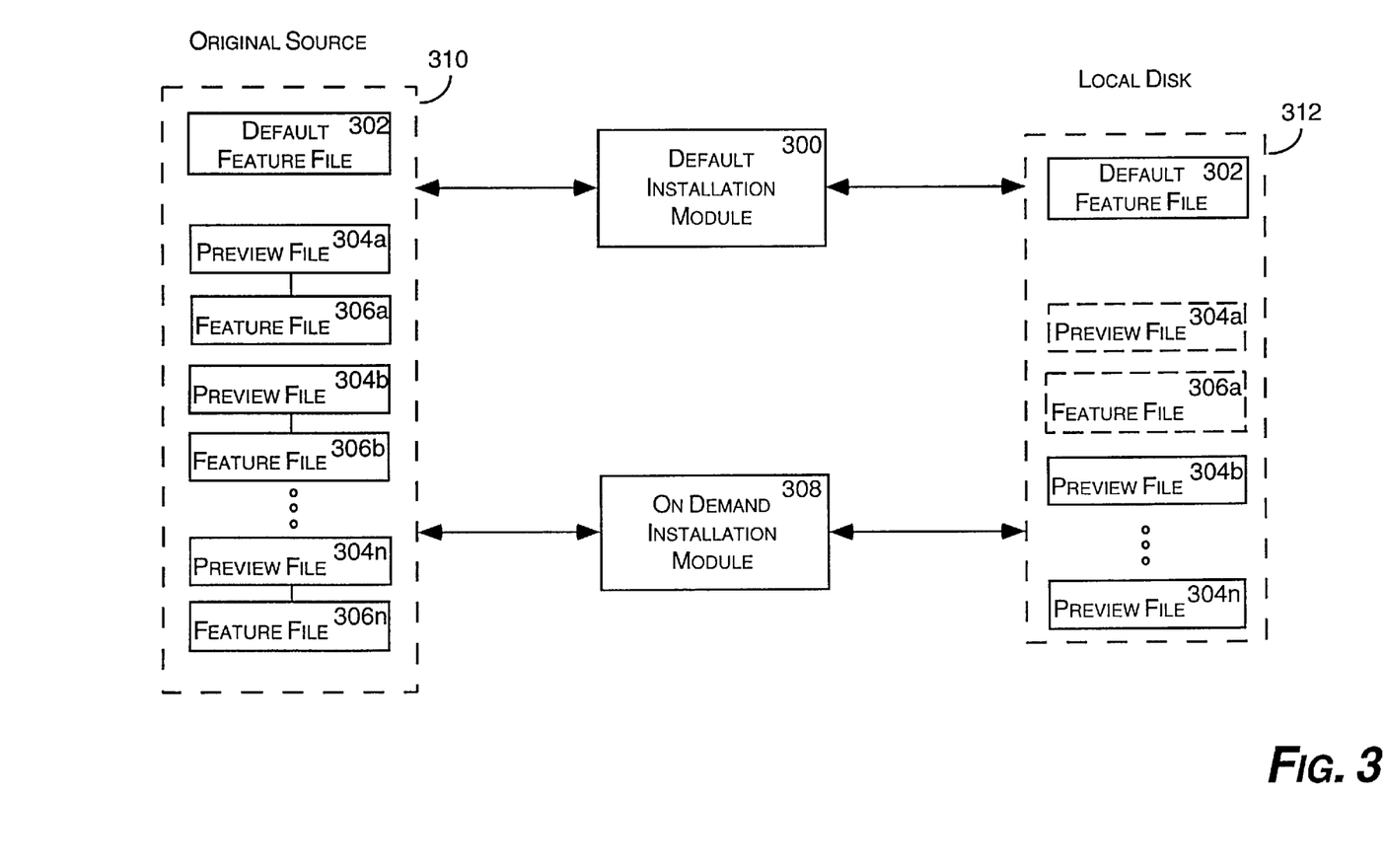
FIG. 3 is a block diagram illustrating the installation modules for an embodiment of the present invention.

The on-demand installation of a feature file is further illustrated by reference to the representative scenario displayed in FIG. 3. In FIG. 3 a default installation module 300 performs the initial installation from the original source 310 to the local disk 312. The original source 310 can include all the feature files $306a, 306b \ldots 306n$, including a default feature file 302, and all the preview files $304a, 304b \ldots 304n$. During installation, the default installation module 300 installs the default feature file 302 and all the preview files $304a, 304b \ldots 304n$ on the local disk 312. Once the default installation module 300 completes the installation, the local disk 312 includes the default feature file 302 and the preview files $304a, 304b \ldots 304n$.

If a feature other than the default feature is selected, then the on-demand installation module 308 performs any required installation. The on-demand installation module 308 responds to the selection of a non-default feature by determining whether the feature file which supports the selected feature is installed on the local disk 312. If the selected feature file is installed on the local disk 312, then the selected feature file is accessed. Otherwise, the on-demand installation module 308 installs the selected feature file. The on-demand installation module 308 installs the selected feature file by locating the selected feature file on the original source 310 and loading the selected feature file onto the local disk. Once the selected feature file is loaded onto the local disk, the on-demand installation module 308 deletes the selected preview file from the local disk 312.

In the example illustrated by FIG. 3, a feature corresponding to preview file 304a and feature file 306a is selected. The on-demand installation module 308 determines that the selected feature is a non-default feature and that the selected feature file 306a is not installed on the local disk. The on-demand installation module 308 locates the selected feature file 306a, which supports the selected feature, on the original source 310 and copies the selected feature file 306a to the local disk 312. Once the on-demand installation module 308 installs the selected feature file 306a, the selected preview file 304a is deleted from the local disk 312. After the on demand installation of selected feature file 306a, the local disk 312 includes the default feature file 302, the selected feature file 306a, and preview files $304b \ldots 304n$. Preview file 304a is no longer included on the local disk 312.

Figure 4:
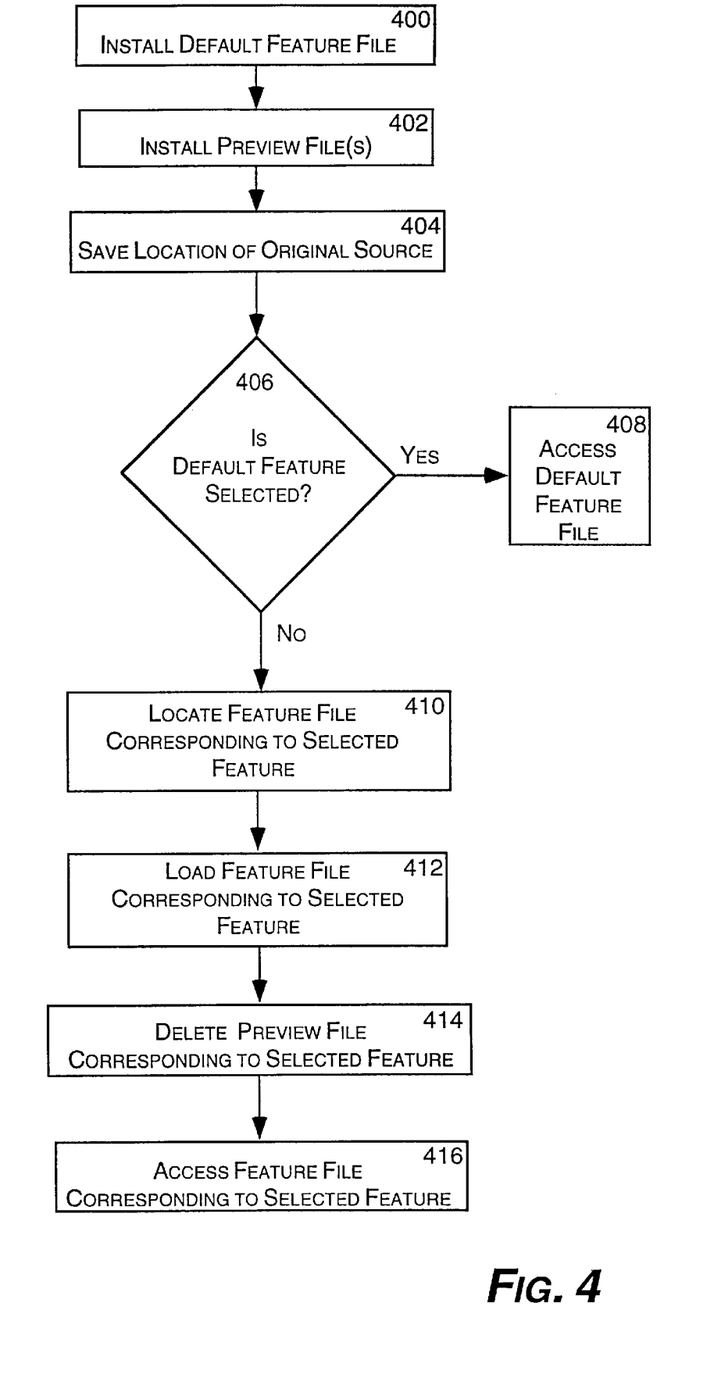
FIG. 4 is a flow diagram illustrating the steps for installing a file on demand in accordance with an embodiment of the present invention.

The exemplary steps for installing a feature file on demand are illustrated by FIG. 4. Steps 400–404 preferably occur during the initial installation. In step 400, the default feature file is installed onto the local disk by copying the default feature file from the original source disk to the local disk. Similarly, in step 402, the preview files are installed onto the local disk by copying the preview files from the original source disk to the local disk. In the Office Assistant embodiment, the default feature file represents the default Office Assistant and the preview files represent additional Office Assistants.

In step 404, the location of the original source which contains the feature files corresponding to the preview files is saved. In the Office Assistant embodiment, a registration entry including a fully qualified path is saved. An example of a registration entry for an original source including Office Assistant feature files is:

HKEY_LOCAL_MACHINE\Software\Microsoft\Office\8.0\
Common\Assistant\AsstSourcePath=<value> where <value> is a fully qualified path to the location of the original source. The location of the feature files relative to the root of the original source is known by the "OFFICE" application programs. Other embodiments may save the location of the feature files in different manners, as will be apparent to those skilled in the art.

Steps 406–416 can occur during operation of the program.

In step 406, a feature is selected. The feature may be manually selected by the user or may be automatically selected in response to a trigger. If the default feature is selected, then the method proceeds to step 408 and the default feature file is accessed in step 408. In the Office Assistant embodiment, the default Office Assistant is selected when one of the "OFFICE" application programs is used so long as a non-default Office Assistant has not been selected.

Figure 5:
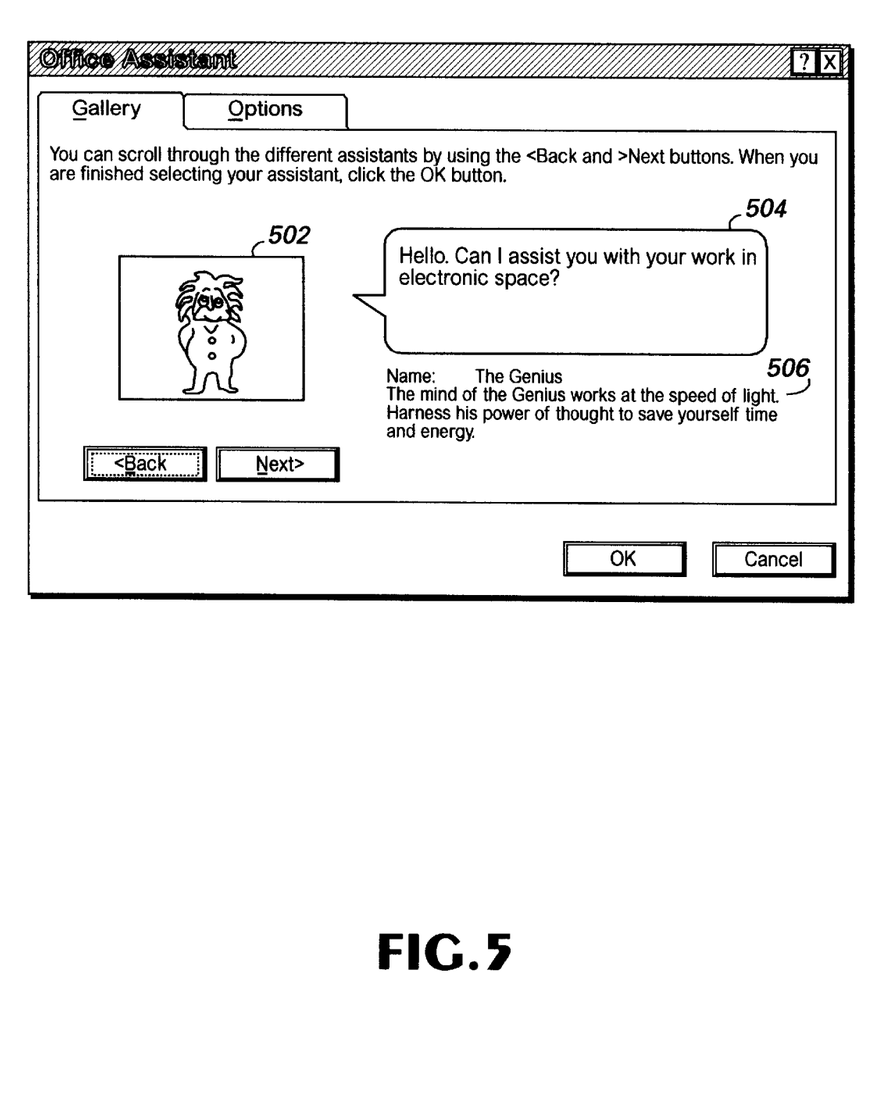
FIG. 5 is a screen shot illustrating a page of the Assistant Gallery in accordance with an embodiment of the present invention.

Alternatively, the user may select a non-default Office Assistant using the Assistant Gallery. A user may preview the different Office Assistants by viewing different pages of the Assistant Gallery. The previously loaded preview files are used to introduce the Office Assistants via the Assistant Gallery. Typically, each preview file includes a single animation component and a few phrase components. An example of a page from the Assistant Gallery is shown in FIG. 5. The page includes an animation component 502 and phrase components 504 and 505. When the user views an Office Assistant using the Assistant Gallery, the animation component and the phrase components provide a glimpse of the Office Assistant's personality. The user may replace the default Office Assistant by selecting one of the non-default Office Assistants from the Assistant Gallery. If a non-default feature is selected, then the method proceeds to step 410.

In step 410, the feature file corresponding to the selected feature is located. The selected feature file is located using the location information saved in step 404. Typically, the name of the preview file and the corresponding feature file are related so that the name of the feature file may be easily determined from the name of the feature file.

Once the selected feature file is located, the feature file is loaded from the original source in step 412. In step 414, the preview file is deleted from the local disk. Since the preview file is a subset of the feature file, there is no reason to store both the feature file and the preview file on the local disk. The feature file corresponding to the selected feature is accessed in step 416.

If an error occurs while attempting to load the selected feature file, then the previously selected feature remains active. In the Office Assistant embodiment, an error may occur if the original source is inaccessible, for example, if the original source is a network disk and the network is inoperable. If an error occurs, then the previously selected Office Assistant remains active.

The steps of FIG. 4 illustrate an embodiment which uses a default feature file. Alternative embodiments may install only preview files. If only preview files are initially installed, then there must be a preview file for every feature file. In addition, if the features represent alternative implementations of the same function, then one of the features must be selected before the function is available. For example, if a default Office Assistant is not installed, then the user must select an Office Assistant before the Office Assistant functions are available.

Although the present invention has been described using an Office Assistant feature file and an Office Assistant preview file, other types of feature files and preview files may be used as will be apparent to those skilled in the art. For example, an image may be represented by a feature file and a preview file. If an image is represented by a feature file and a preview file, then the feature file may represent a high resolution image and the preview file may represent a low resolution image or the feature file may represent a complete image and the preview file may represent only a portion of the image.

In summary, the present invention is directed toward installation of a file on demand using a preview file. A feature is represented by a preview file and a feature file. The preview file is a strict subset of the feature file. During initial installation, only the preview file is installed. The preview file may be used to preview and select the feature. If the feature is selected, then the feature file corresponding to the feature is installed on the local disk and the preview file is deleted. The loading of the feature file and the deleting of the preview file are transparent to the user. Alternative embodiments will become apparent to those skilled in the art to which the present invention pertains without departing from its spirit and scope. Accordingly, the scope of the present invention is described by the appended claims and is supported by the foregoing description.

What is claimed is:

1. A computer-readable medium having computer-executable instructions comprising the steps of:

installing a default feature file corresponding to a default feature on a local disk, the default feature file comprising a set of default feature components that support operation of the default feature;

installing a selected preview file corresponding to a selected feature on the local disk, the selected preview file comprising a subset of selected feature components that support previewing and selecting the selected feature;

creating a location entry to store location information for an original source that includes a selected feature file corresponding to the selected feature, the selected feature file comprising a set of selected feature components;

in response to a request to preview the selected feature, using the selected preview file to preview the selected feature;

determining whether the selected feature is selected to replace the default feature;

if the selected feature is selected, then (i) installing the selected feature file on the local disk from the original source by using the location entry to locate the original source; and (ii) deleting the selected preview file from the local disk that space on the local disk is conserved.

2. The computer-readable medium of claim 1, further comprising the step of:

installing a default preview file corresponding to the default feature on the local disk, the default preview file comprising a subset of the default feature components that support previewing and selecting the default feature.

3. The computer-readable medium of claim 1, wherein the set of selected feature components comprises a plurality of animation components, a plurality of phrase components, and a plurality of sound components, and wherein the subset of selected feature components comprises a selected animation component and a selected phrase component.

4. The computer-readable medium of claim 1, further comprising the step of:

deleting the default feature file after installing the selected feature file on the local disk.

5. A computer-readable medium having computer-executable modules comprising:

a default installation module for installing a default feature file corresponding to a default feature that provides a fully operational default feature, for installing a plurality of preview files, each of the preview files corresponding to a feature and providing a preview of the corresponding feature, and for storing a location for an original source that includes a plurality of feature files corresponding to the plurality of preview files when an application program is installed; and an on-demand installation module for installing a selected feature file corresponding to a selected one of the preview files to replace the default feature when a selected feature corresponding to the selected one of the preview files is selected and for deleting the default feature file.

6. The computer-readable medium of claim 5, wherein the selected feature file includes a set of animation components, a set of phrase components, and a set of sound components, and wherein the selected preview file includes a selected one of the animation components and a subset of the selected phrase components.

7. The computer-readable medium of claim 5, wherein the on-demand installation module uses the location for the original source to locate the original source to install the selected feature file.

8. A method for installing a selected feature file using a selected preview file comprising the steps of:

installing an application program having a default feature that is supported by a default feature file;

installing a plurality of preview files, each preview file providing a preview of a corresponding feature;

storing information for locating an original source that includes a plurality of feature files, each feature file corresponding to one of the preview files;

in response to a request to preview the selected feature, providing a preview of the selected feature using a selected one of the preview files;

in response to a request to install the selected feature, using the information for locating the original source to locate the selected feature file;

installing the selected feature file from the original source; and if the selected feature file is successfully installed, then deleting the default feature file.

9. The method of claim 8, wherein the selected feature file comprises a set of animation components and a set of phrase components, and wherein the selected preview file comprises a subset of the set of animation components and a subset of the set of phrase components.

10. The method of claim 8, further comprising the step of:

if the default feature file is deleted, then installing a default preview file corresponding to the default feature.

11. A method for installing a selected user interface feature selected from a plurality of user interface features, each user interface feature represented by a corresponding feature file and preview file, comprising the steps of:

storing information for locating an original source that includes a plurality of user interface feature files and a corresponding plurality of user interface preview files, each user interface feature file including a set of feature components and each user interface preview file including a subset of the feature components;

installing the plurality of preview files;

in response to a request to preview the selected user interface feature, presenting a preview of the selected user interface by executing a subset of selected feature components that correspond to the selected preview file; and in response to a request to install the selected user interface feature, installing the selected feature file that corresponds to the selected user interface feature from the original source, the selected feature file including a set of selected feature components.

12. The method of claim 11, further comprising the step of:

installing a default user interface feature by installing a default feature file that includes a set of default feature components.

13. The method of claim 12, further comprising the step of:

if the selected feature file is successfully installed, then deleting the default feature file; and installing a default preview file that includes a subset of the default feature components.

* * * * *